United States Patent
Moravek et al.

(10) Patent No.: US 10,981,158 B2
(45) Date of Patent: *Apr. 20, 2021

(54) CATALYTIC COMPOSITIONS AND THIOLENE-BASED COMPOSITIONS WITH EXTENDED POT LIFE

(71) Applicant: PPG INDUSTRIES OHIO, INC., Cleveland, OH (US)

(72) Inventors: Scott J. Moravek, Mars, PA (US); Davina J. Schwartzmiller, Rural Valley, PA (US); Stefano Gianellini, Cornaredo (IT); Matteo Bertoli, Casnate con Bernate (IT); Maurizio Ballarino, Milan (IT); Steven Bowles, Pittsburgh, PA (US); Adam Bradley Powell, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/228,043

(22) Filed: Dec. 20, 2018

(65) Prior Publication Data

US 2020/0197918 A1  Jun. 25, 2020

(51) Int. Cl.
| | |
|---|---|
| *B01J 31/28* | (2006.01) |
| *C08L 33/08* | (2006.01) |
| *C08L 33/10* | (2006.01) |
| *C08L 67/06* | (2006.01) |
| *C08L 69/00* | (2006.01) |
| *C08L 75/14* | (2006.01) |
| *C08L 35/02* | (2006.01) |
| *C09D 175/14* | (2006.01) |

(52) U.S. Cl.
CPC ............... *B01J 31/28* (2013.01); *C08L 33/08* (2013.01); *C08L 33/10* (2013.01); *C08L 35/02* (2013.01); *C08L 67/06* (2013.01); *C08L 69/00* (2013.01); *C08L 75/14* (2013.01); *C09D 175/14* (2013.01); *B01J 2231/4294* (2013.01); *B01J 2531/842* (2013.01); *B01J 2540/40* (2013.01)

(58) Field of Classification Search
CPC ........... B01J 31/28; C08L 33/08; C08L 35/02; C08L 67/06; C08L 69/00; C08L 75/14; C09D 175/14
USPC .......................................................... 502/150
See application file for complete search history.

(56) References Cited

U.S. PATENT DOCUMENTS

| | | | |
|---|---|---|---|
| 3,676,283 A * | 7/1972 | Kehr et al. ............. | B32B 27/00 442/149 |
| 3,898,349 A | 8/1975 | Kehr et al. | |
| 3,908,039 A | 9/1975 | Guthrie et al. | |
| 4,076,917 A | 2/1978 | Swift et al. | |
| 4,097,298 A | 6/1978 | Haeufler et al. | |
| 4,374,235 A | 2/1983 | Culbertson et al. | |
| 4,425,472 A | 1/1984 | Howard et al. | |
| 4,698,385 A | 10/1987 | Schindler | |
| 4,767,804 A | 8/1988 | Willoughby | |
| 4,808,638 A * | 2/1989 | Steinkraus ............ | C08G 75/12 522/167 |
| 4,908,397 A | 3/1990 | Barsotti et al. | |
| 5,236,967 A * | 8/1993 | Ohkawa ............. | C08F 299/022 522/100 |
| 5,976,422 A * | 11/1999 | Okoroafor .............. | G02B 5/23 252/183.11 |
| 6,639,046 B1 | 10/2003 | Van Dijk | |
| 9,464,203 B2 | 10/2016 | Powell et al. | |
| 9,617,365 B2 | 4/2017 | Moravek et al. | |
| 2005/0027082 A1 | 2/2005 | Narayan-Sarathy et al. | |
| 2009/0047442 A1* | 2/2009 | Bowman ............ | C08G 18/622 427/487 |
| 2009/0047531 A1* | 2/2009 | Bartley .................. | C09D 4/00 428/515 |

FOREIGN PATENT DOCUMENTS

| | | | |
|---|---|---|---|
| CA | 2371636 A1 | 10/2001 | |
| EP | 0810251 A2 | 12/1997 | |
| GB | 1469935 | 4/1977 | |
| JP | H59415 A | 1/1993 | |
| JP | H9255741 A | 9/1997 | |
| WO | 88/02879 A1 | 4/1988 | |
| WO | WO-8802879 A1 * | 4/1988 | ........... C08G 75/045 |
| WO | WO-2008/003498 A1 | 1/2008 | |

* cited by examiner

*Primary Examiner* — Michael Bernshteyn
(74) *Attorney, Agent, or Firm* — Krisanne Shideler

(57) ABSTRACT

The present invention is directed to catalytic compositions and to curable compositions containing them. Catalytic compositions of the present invention consist essentially of: (i) a metal compound; and (ii) a compound different from (i) that catalyzes an addition reaction between an ethylenically unsaturated compound and a thiol, wherein said catalytic composition is essentially free of vanadium compounds. Curable compositions according to the present invention comprise: (a) a polyene, (b) a polythiol, and (c) a catalytic component, which consists of the afore-mentioned catalytic composition.

20 Claims, No Drawings

CATALYTIC COMPOSITIONS AND THIOLENE-BASED COMPOSITIONS WITH EXTENDED POT LIFE

FIELD OF THE INVENTION

The present invention relates to catalytic compositions and to curable compositions with extended pot life, the curable compositions comprising a polyene, a polythiol, and the catalytic composition.

BACKGROUND OF THE INVENTION

Catalysis is an initiation or a change in the rate of a chemical reaction due to the participation of a material called a catalyst. Catalysts that speed the reaction are known as positive catalysts. Catalysts that slow the reaction are known as negative catalysts, or inhibitors. Unlike reactants, a catalyst is not consumed by the reaction itself.

A catalyst works by providing an alternative reaction mechanism pathway from the reactants to the reaction product. The rate of the reaction is increased when this alternative route has a lower activation energy than the reaction route not mediated by the catalyst. Catalysts can also enable reactions that would otherwise be blocked or slowed by a thermodynamic or kinetic barrier. The catalyst may increase a reaction rate or selectivity of the reactants, or enable the reaction to proceed at lower temperatures than would otherwise be possible. As such, catalysts can be very valuable tools in industrial chemical processes.

There can nevertheless be drawbacks to the use of catalysts. For example, tin compounds are used extensively in industrial products such as coatings as catalysts for isocyanate/hydroxyl reactions. Amine compounds are used as catalysts for polyene/thiol reactions. Unfortunately, the levels of these catalysts required to provide acceptably fast cure rates and final product properties often result in a short application time window after the reactants are mixed.

There is thus a need to work in a timely manner so that the mixed components maintain a low enough viscosity for application to a substrate, such as by spraying. The span of time during which the coating is ready to apply to a substrate and still of low enough viscosity to be applied is commonly referred to as "pot life." It is defined more quantitatively below.

Typically, pot life must be balanced with cure speed of the applied coating. For instance, in a multi-component coating system that uses a catalyst, the pot life and cure speed are primarily controlled by the amount of catalyst present. Accordingly, if a fast cure speed is required more catalyst can be used but that will also cause a shorter pot life. Conversely, if a longer pot-life is needed less catalyst can be used but the cure speed would also be retarded.

It is also important that the applied coating composition dry and harden quickly so that dirt pick-up is minimized and valuable shop space is not occupied with the coated substrate, such as an automobile, while it is drying. The length of time between when a coating is applied to a substrate and when the coating has dried or cured sufficiently that dust or other debris falling onto the coated substrate will not stick to the coated substrate is referred to as "dust-free time" or "tack-free time" and is an indicator of the speed of cure. One way to speed the drying and cure of the composition is to add additional catalyst, but this shortens the time available for processing, e. g., by spraying, since higher catalyst levels also cause the viscosity of the composition to increase more quickly as reaction rates increase.

Polyenes containing unsaturated groups, such as acryloyl groups, react with active hydrogen-containing compounds. Such a reaction is believed to involve an addition of an anion derived from the nucleophilic, active hydrogen-containing compound, acting as a donor, to an activated unsaturated group, which serves as an acceptor. When these active hydrogen-containing compounds are C—H compounds such as malonic ester or acetoacetate, the reaction is known as a Michael addition reaction. It is also known that SH-containing compounds may function as active hydrogen-containing compounds in a reaction mechanism which is similar to the Michael addition reaction. Such a reaction mechanism with SH-containing compounds is known as a thiolene reaction.

Catalysts for the thiolene reaction include amine compounds, for example, tetramethyl guanidine, diaza-bicycloundecene, and diaza-bicyclo-nonene. Thiolene reactions catalyzed by these strong bases can be difficult to control and such reaction mixtures typically have a short pot life.

It would be desirable to catalyze chemical reactions between polyenes and thiols using catalysts that overcome these drawbacks of the prior art by lengthening the pot life of the composition and/or by accelerating the thiolene reaction rate after application, such as to achieve a short tack-free time, without adversely affecting the pot life of the composition and/or the chemical resistance of coatings derived therefrom.

SUMMARY OF THE INVENTION

It has now been found that these objectives can be achieved by the use of certain catalytic compositions. The catalytic compositions of the present invention consist essentially of:

(i) a metal compound; and (ii) a compound that catalyzes an addition reaction between an ethylenically unsaturated compound and a thiol. The catalytic compositions of the present invention are essentially free, such as completely free, of vanadium compounds. The compound (ii) is different from the metal compound (i). The catalytic composition according to the present invention thus includes two distinct types of compounds. It is typically essentially free, such as completely free, of reactive compounds comprising acid-functional groups, anhydride groups, or reaction products of an active hydrogen compound with an anhydride or polyacid. The transitional phrase "consisting essentially of" means that the composition is limited to the specified materials or steps "and those that do not materially affect the basic and novel characteristic(s)" of the claimed invention. In re Herz, 537 F.2d 549, 551-52, 190 USPQ 461, 463 (CCPA 1976) (emphasis in original).

The present invention also relates to curable compositions comprising:

(a) a polyene;

(b) a polythiol, present in an amount greater than 10 percent by weight based on the total weight of resin solids in the curable composition; and (c) a catalytic component, which consists of the catalytic composition according to the present invention, described above and in more detail in the following.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

Unless otherwise indicated, molecular weights are reported as number average molecular weights determined by gel permeation chromatography relative to polystyrene standards with the unit of g/mol.

As set forth above, the catalytic compositions of the present invention contain (i) a metal compound. Suitable metal compounds include at least one of a metal oxide, a metal salt, including organic and inorganic salts, and an organometallic compound. Metals that may be present in the metal compound (i) include, e.g., iron, tin, cobalt, magnesium, manganese and mixtures thereof. The metal compound (i) present in the catalytic composition according to the present invention may often comprise an iron compound. Exemplary metal compounds include e.g. iron (II) and iron (III) compounds such as iron oxides, ferrous or ferric acetate, and metal halides such as ferric chloride and ferrous chloride.

The catalytic compositions of the present invention also contain (ii) a compound that catalyzes an addition reaction between an ethylenically unsaturated compound and a thiol. The catalytic compound (ii) may for example comprise a base. The catalytic compound (ii) may for example comprise an organic compound that has one or more nitrogen and/or phosphorus atom(s). Suitable catalytically active compounds (ii) include e.g. primary, secondary and tertiary amines and phosphines. Specific non-limiting examples of such compounds include for instance oxazolidines, triethylamine, dimethylhexylamine, dimethylcyclohexylamine, dimethyloctylamine, dimethyldodecylamine, dimethyl-amino alcohols such as dimethylamino ethanol, tetramethyl guanidine, diaza-bicyclo-octane, diaza-bicyclo-undecene, diaza-bicyclo-nonene, n-methyl-triaza-bicyclodecene, trioctyl phosphine and triphenyl phosphine.

The compound (ii) may comprise a substituted carbonate salt. For example, quaternary ammonium, and phosphonium carbonates are suitable. Particular examples include tetrahexylammonium methylcarbonate, tetrahexylammonium bicarbonate, tetradecyl-trihexylammonium methylcarbonate, and tetradecylammonium methylcarbonate. Such substituted carbonate salts are disclosed in United States Patent Application Publication Number 2013/0210986 at paragraphs [0032] to [0039]. Combinations of any of the mentioned compounds may also be used where suitable.

Typically the molar ratio of nitrogen (as in an amine or ammonium group) or phosphorus (as in a phosphine or phosphonium group) in the compound (ii) to metal in the metal compound (i) is 0.4 to 500:1, such as 1 to 100:1 or 25 to 75:1. For example, when the metal compound (i) comprises an iron compound and the compound (ii) comprises a secondary or tertiary amine group-containing compound, the molar ratio of amine group (and thus N) to iron is usually 0.4 to 500:1, such as 0.9 to 30:1, or 1 to 10:1 or 25 to 75:1.

The catalytic compositions of the present invention are essentially free, and may be completely free, of vanadium compounds. They may furthermore be essentially free, or completely free, of reactive compounds comprising acid-functional groups or groups that may be converted to acid-functional groups via an appropriate chemical reaction. Examples of such reactive compounds include an anhydride, an acid (including, for example, carboxylic, phosphonic, or sulfonic acids), or a reaction product of an active hydrogen compound with an anhydride or polyacid. By "essentially free" of a material is meant that a composition has only trace or incidental amounts of a given material, and that the material is not present in an amount sufficient to affect any properties of the composition. These materials are not essential to the composition and hence the composition is free of these materials in any appreciable or essential amount. Moreover, they may materially affect the basic and novel characteristic(s) of the invention because they may exhibit catalytic activity. If they are present, it is in incidental amounts only, typically less than 0.1 percent by weight, such as less than 0.05 percent by weight, or less than 0.01 percent by weight, based on the total weight of solids in the composition. "Completely free" as used herein means that the composition does not contain the recited materials at all or at least not in measurable amounts.

The catalytic compositions of the present invention are useful to extend pot life as defined below and at the same time provide a rapid curing time for various curable compositions, in particular, compositions that undergo thiolene-type reactions. The catalytic compositions of the present invention are more effective at extending the pot life of compositions that undergo thiolene-type reactions than conventional catalysts. These curable compositions are often useful as automotive refinish coatings because they can be reactive and cured at ambient temperatures. By "ambient" is meant the condition of surroundings without adjustment of the temperature, humidity or pressure. Ambient temperature usually ranges from 40 to 95° F. (about 4 to 35° C.), often 60 to 95° F. (about 15 to 35° C.), such as a typical room temperature, 72° F. (22.2° C.).

Catalyst compositions of the present invention can also be used to extend the pot life and provide a rapid curing time for thiolene reactions in aerospace coating and sealant systems based on thiolene curing chemistry. Coatings and sealants useful in aerospace applications must meet a number of demanding performance requirements including resistance to aviation fluids. Prepolymers having sulfur groups in the backbone such as polythioether, polysulfides, and sulfur-containing polyformals can be advantageously used in aerospace coatings and sealants. These sulfur-containing prepolymers can be reacted with a polyene in the presence of an amine catalyst to provide a cured coating or sealant suitable for aerospace applications. Compositions comprising thiol-terminated sulfur-containing prepolymers and polyenes such as acrylates are disclosed in U.S. Application Publication No. 2006/0270796 and are suitable for use in the curable compositions of the present invention described below. Compositions comprising thiol-terminated sulfur-containing prepolymers are disclosed in U.S. Application Publication Nos. 2013/0343371, 2014/0378649, 2015/0119549, 2015/0252233, 2013/0345389, and 2015/0099858, and 2015/0252232 and are suitable for use in the curable compositions of the present invention. Compositions comprising thiol-terminated sulfur-containing prepolymers suitable for use in aerospace sealant applications and thiolene curing chemistries are disclosed, for example, in U.S. Application Publication Nos. 2012/00401303 and 2014/0186543 and are suitable for use in the curable compositions of the present invention. The term "polymer" is also meant to include copolymer, oligomer, and prepolymer; i. e., a material that may be chain extended to increase its molecular weight.

The present invention also relates to curable compositions comprising:
(a) a polyene,
(b) a polythiol, and
(c) a catalytic component, which consists of the catalytic composition of the present invention as described above. The term "catalytic component" or "catalytic composition" as used herein refers collectively to all the materials disclosed above that each have, either individually or in some combination with one or more of the other materials, a catalytic effect on the reaction of the polyene (a) and the polythiol (b), i.e. affect the reaction kinetics without being permanently consumed by the reaction. Though not intending to be bound by theory, it is believed that the metal compound (i) provides "surface cure" to the composition; for example, when the curable composition is applied to a substrate as a coating, the metal compound (i) catalyzes the cure of the coating composition at the outermost region of the coating layer opposite the substrate surface and exposed to air. Likewise, when the curable composition is molded or otherwise shaped into an article of manufacture, the metal compound (i) catalyzes the cure of the composition on the surface thereof. It is further believed that the compound (ii) provides "through cure" to the composition, which is curing through the bulk of the composition.

Suitable polyenes (a) for use in the curable compositions of the present invention are numerous and can vary widely. Such polyenes can include those that are known in the art. Non-limiting examples of suitable polyenes can include those that are represented by the formula:

A-(X)$_m$ wherein A is an organic moiety, X is an olefinically unsaturated moiety, an alkynyl group, and/or a Michael acceptor group, and m is at least 2, typically 2 to 6. The organic moiety A can comprise C, H and heteroatoms. The organic moiety A can comprise can e. g. contain one or more group(s) selected from ester and urethane groups. The organic moiety A can, for example, be derived from a polyisocyanate such as set forth below for polyurethane (meth)acrylates and polyurethanes containing (meth)allyl groups. Non-limiting examples of X are groups of the following structures:

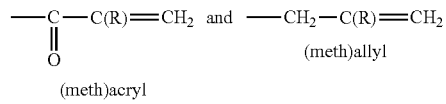

wherein each R is selected from H and a methyl group. Note that "acrylic" and "methacrylic" are designated herein in a summarizing manner as "(meth)acrylic". Likewise, "allyl" and "methallyl" are designated herein in a summarizing manner as "(meth)allyl". The phrase "derived from a polyisocyanate" refers herein to a moiety that results from the reaction of an isocyanate group —N=C=O of a polyisocyanate with a group reactive with an isocyanate group such as a hydroxyl group. Similarly, "derived from a polyol", such as in the expression "$R_1$ is derived from a polyol", refers to a moiety resulting from the reaction of an alcoholic hydroxyl group —OH of a polyol with a group reactive with a hydroxyl group such as a carboxyl group.

Suitable polyenes include compounds or polymers having in the molecule olefinic double bonds that are polymerizable such as by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates, of which polyester (meth)acrylates and polyurethane (meth)acrylates are particularly useful. The number average molecular weight ($M_n$) of these compounds is often around 200 to 10,000. Suitable polyenes typically contain on average 2 to 20 olefinic double bonds that are polymerizable e.g. by exposure to radiation per molecule. Aliphatic and/or cycloaliphatic (meth)acrylates are usually used. "Aliphatic" and "cycloaliphatic" are designated herein in a summarizing manner as "(cyclo)aliphatic". (Cyclo)aliphatic polyurethane (meth)acrylates and (cyclo)aliphatic polyester (meth)acrylates are particularly suitable. Combinations of a plurality of polyenes such as any of those mentioned herein may likewise be used as polyene (a) in the curable compositions according to the present invention.

As mentioned above, polyurethane (meth)acrylates are suitable for use as the polyene (a). Examples of polyurethane (meth)acrylates include reaction products of polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. The polyisocyanate can be reacted with the hydroxyalkyl (meth)acrylate in a 1:1 NCO/OH equivalent ratio or can be reacted with an NCO/OH equivalent ratio greater than 1:1 to form an NCO-functional reaction product that can then be chain extended with a polyol such as a diol or triol, for example 1,4-butane diol, 1,6-hexane diol and/or trimethylol propane.

Polyester (meth)acrylates are also suitable for use as the polyene (a), and include, for example, reaction products of (meth)acrylic acid or (meth)acrylic acid anhydride with polyols, such as diols, triols, tetraols and higher polyols, including alkylated polyols, such as propoxylated diols and triols. Examples of suitable polyols include glycerol, 1,4- butane diol, 1,6-hexane diol, neopentyl glycol, trimethylol propane, pentaerythritol and propoxylated 1,6-hexane diol. Specific examples of suitable polyester (meth)acrylates are for instance glycerol tri(meth)acrylate, trimethylolpropane tri(meth)acrylate, pentaerythritol tri(meth)acrylate, pentaerythritol tetra(meth)acrylate, and dipentaerythritol penta (meth)acrylate.

(Meth)allyl compounds or polymers can also be used either alone or in combination with (meth)acrylate compounds such as those described above as the polyene (a) in the curable compositions according to the present invention. Examples of (meth)allyl materials are polyallyl ethers such as the diallyl ether of 1,4-butane diol and the triallyl ether of trimethylol propane. Examples of other (meth)allyl compounds are polyurethanes containing (meth)allyl groups, including reaction products of polyisocyanates such as 1,6-hexamethylene diisocyanate and/or isophorone diisocyanate (including isocyanurate and biuret derivatives thereof) with hydroxyl-functional allyl ethers, such as the monoallyl ether of 1,4-butane diol and the diallylether of trimethylol propane. The polyisocyanate can be reacted with the hydroxyl-functional allyl ether in a 1:1 NCO/OH equivalent ratio or can be reacted with an NCO/OH equivalent ratio greater than 1:1 to form an NCO-containing reaction product that can then be chain extended with a polyol such as a diol or triol, for example 1,4-butane diol, 1,6-hexane diol and/or trimethylol propane.

As mentioned above, the polyene (a) can also comprise one or more Michael acceptor groups. A "Michael acceptor group" refers to an alkenyl/alkynyl moiety in which one or more electron-withdrawing groups such as carbonyl (—C=O), nitro (—NO$_2$), nitrile (—CN), alkoxycarbonyl (—COOR), phosphonate (—PO(OR)$_2$), trifluoromethyl (—CF$_3$), sulfonyl (—SO$_2$), p-toluenesulfonyl (—SO$_2$—C$_6$H$_4$—CH$_3$), etc., is directly bonded to a carbon atom of the carbon-carbon double or triple bond, respectively. Types of compounds that include a Michael acceptor group are e.g. vinyl ketones, quinones, nitroalkenes, acrylonitriles, acrylates, methacrylates, cyanoacrylates, acrylamides, maleimides, dialkyl vinylphosphonate, and vinylsulfones. Other examples of Michael acceptors are disclosed in Mather et al., *Prog. Polym. Sci.* 2006, 31, 487-531. Michael acceptor compounds having more than one Michael acceptor group are also well known. Examples include diacrylates such as ethylene glycol diacrylate and diethylene glycol diacrylate, dimethacrylates such as ethylene glycol methacrylate and diethylene glycol methacrylate, bismaleimides such as N,N'-(1,3-phenylene)dimaleimide and 1,1'-(methylenedi-4,1-phenylene)bismaleimide, vinylsulfones such as divinyl sulfone and 1,3-bis(vinylsulfonyl)-2-propanol, etc. A Michael acceptor group, which may be present in the polyene (a) according to the present invention may for instance have the structure of Formula (1a) or Formula (1b):

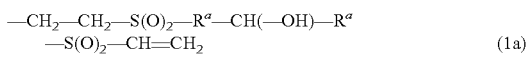

—CH$_2$—CH$_2$—S(O)$_2$—R$^a$—CH(—OH)—R$^a$
—S(O)$_2$—CH=CH$_2$ (1a)

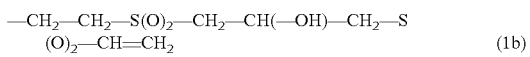

—CH$_2$—CH$_2$—S(O)$_2$—CH$_2$—CH(—OH)—CH$_2$—S
(O)$_2$—CH=CH$_2$ (1b)

where each R$^a$ is independently selected from C$_{1-3}$ alkanediyl and substituted C$_{1-3}$ alkanediyl, wherein the one or more substituent groups is —OH.

A "maleimide" refers herein to a compound having a maleimide group:

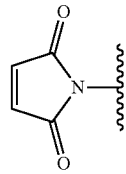 [SMILES: *N1C(=O)C=CC1=O]

A bismaleimide refers to a compound having two maleimide groups, where the two maleimide groups are bonded by the nitrogen atoms via a linking atom or group.

A Michael acceptor compound may accordingly be used as polyene (a) in the curable composition according to the present invention. A "Michael acceptor compound" refers to a compound comprising at least one terminal Michael acceptor group. In certain examples, a Michael acceptor compound is a divinyl sulfone, and a Michael acceptor group is vinylsulfonyl, i. e.,

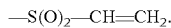

—S(O)$_2$—CH=CH$_2$.

For example, a Michael acceptor compound may be a bis(vinylsulfonyl)alkanol, and a Michael acceptor group may e.g. be 1-(ethylenesulfonyl)-n-(vinylsulfonyl)alkanol, or 1-(ethylenesulfonyl)-3-(vinylsulfonyl)propan-2-ol.

A Michael acceptor group that can be present in compounds suitable as polyene (a) in curable compositions according to the present invention may also be a maleimide and in certain examples, a 1-(4-(4-(3-yl-2,5-dioxopyrrolidin-1-yl)benzyl)phenyl)-1H-pyrrole-2,5-dione group.

Michael addition chemistries may be employed in a variety of ways to provide curable compositions suitable in particular for use in aerospace sealant applications. For example, a curable composition provided by the present disclosure may comprise (i) a thiol-terminated sulfur-containing prepolymer as the polythiol (b) and a Michael acceptor-terminated sulfur-containing prepolymer as the polyene (a); (ii) a mixture of a thiol-terminated sulfur-containing prepolymer and a low molecular weight polythiol as the polythiol (b), and a Michael acceptor-terminated sulfur-containing prepolymer as the polyene (a); (iii) a thiol-terminated sulfur-containing prepolymer as the polythiol (b), and a mixture of a Michael acceptor-terminated sulfur-containing prepolymer and a low molecular weight compound having at least two Michael acceptor groups as the polyene (a); or (iv) a mixture of a thiol-terminated sulfur-containing prepolymer and a low molecular weight polythiol as the polythiol (b), and a mixture of a Michael acceptor-terminated sulfur-containing prepolymer and a low molecular weight compound having at least two Michael acceptor groups as the polyene (a).

Michael acceptor-terminated sulfur-containing prepolymers and thiol-terminated sulfur-containing polymers may be derived from polythioethers, polysulfides, sulfur-containing polyformals, or combinations of any of the foregoing.

Low molecular weight polythiols and low molecular weight Michael acceptors compounds can have an average molecular weight less than about 400 Daltons, or less than about 1,000 Daltons.

Michael acceptor-terminated sulfur-containing prepolymers can have at least two terminal unsaturated groups that are activated for Michael addition such as activated unsaturated groups that serve as a Michael addition acceptor.

Michael acceptor-terminated sulfur-containing prepolymers that can be used as polyene (a) in the curable compositions according to the present invention typically comprise at least two terminal Michael acceptor groups. Suitable Michael-acceptor-terminated sulfur-containing prepolymers may thus for instance be difunctional, or may have a functionality greater than 2 such as 3, 4, 5, or 6. The Michael-acceptor-terminated sulfur-containing prepolymer may also comprise a mixture of Michael-acceptor-terminated sulfur-containing prepolymers, which can have different functionalities, characterized by an average functionality from 2.05 to 6, from 2.1 to 4, from 2.1 to 3, from 2.2 to 2.8, or from 2.4 to 2.6. Accordingly, suitable Michael-acceptor-terminated sulfur-containing prepolymers can have at least two terminal Michael acceptor groups, or can have two terminal Michael acceptor groups, 3, 4, 5, or 6 terminal Michael acceptor groups. A Michael-acceptor-terminated sulfur-containing prepolymer may also comprise a combination of adducts, which may each have different numbers of terminal Michael acceptor groups, characterized, for example, by an average Michael acceptor functionality of from 2.05 to 6, from 2.1 to 4, from 2.1 to 3, from 2.2 to 2.8, or from 2.4 to 2.6.

Suitable Michael acceptor-terminated sulfur-containing prepolymers include Michael acceptor-terminated polythioethers, Michael acceptor-terminated polysulfides, Michael acceptor-terminated sulfur-containing polyformals, and combinations of any of the foregoing. For example, any of the polythioethers, polysulfides, and sulfur-containing polyformals suitable for use as thiol-terminated sulfur-containing prepolymers may also be used as the backbone for a Michael acceptor-terminated sulfur-containing prepolymer.

Michael acceptor-terminated sulfur-containing prepolymers suitable for use in aerospace sealant applications are disclosed, for example, in U.S. Application Publication Nos. 2014/0378649, 2014/0378649, and 2015/0119549.

As mentioned above, a Michael acceptor-terminated sulfur-containing prepolymer useful as polyene (a) in the curable compositions according to the present invention can comprise a Michael acceptor-terminated polythioether.

A Michael acceptor-terminated sulfur-containing prepolymer can, for example, comprise a Michael acceptor-terminated polythioether comprising:
(a) a backbone comprising the structure of Formula (2):

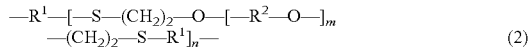
(2)

where (i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, a $—[(—CHR^3—)_p—X—]_q—(CHR^3)_r—$ group, wherein each $R^3$ is independently selected from hydrogen and methyl; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, and a $—[(—CH_2—)_p—X—]_q—(CH_2)_r—$ group; (iii) each X is independently selected from O, S, and a $—NR^4—$ group, in which $R^4$ is selected from H and a methyl group; (iv) m is an integer ranging from 0 to 50; (v) n is an integer ranging from 1 to 60; (vi) p is an integer ranging from 2 to 6; (vii) q is an integer ranging from 1 to 5; and (viii) r is an integer ranging from 2 to 10; and
(b) at least two terminal Michael acceptor groups, which can each individually be selected from any of the Michael acceptor groups described herein.

In a compound of Formula (2), $R^1$ can in particular be $—[(—CHR^3)_p—X—]_q—(CHR^3)_r—$ wherein each X can independently be selected from $—O—$ and $—S—$, wherein usually each X is $—O—$ or each X is $—S—$.

More specifically in a compound of Formula (2), $R^1$ can in particular be $—[(—CH_2)_p—X—]_q—(CH_2)_r—$ wherein each X can independently be selected from $—O—$ and $—S—$. Usually each X is $—O—$ or each X is $—S—$ herein.

Even more specifically, in a compound of Formula (2), $R^1$ can be $—[(—CH_2—)_p—X—]_q—(CH_2)_r—$, wherein p can be 2, X can be O, q is 2, r can be 2, $R^2$ can be ethanediyl, m can be 2, and n can be 9.

A Michael acceptor-terminated sulfur-containing prepolymer useful as polyene (a) according to the present invention can e.g. comprise a Michael acceptor-terminated polythioether of Formula (3a), a Michael acceptor-terminated polythioether of Formula (3b), or a combination thereof:

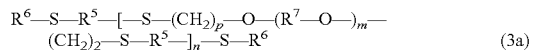
(3a)

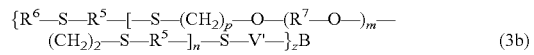
(3b)

wherein: each $R^5$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR^8—)_s—X—]_q—(—CHR^8—)_r—$, wherein: s is an integer from 2 to 6; q is an integer from 1 to 5; r is an integer from 2 to 10; each $R^8$ is independently selected from hydrogen and methyl; and each X is independently selected from $—O—$, $—S—$, $—NH—$, and $—N(—CH_3)—$; each $R^7$ is independently selected from $C_{1-10}$ alkanediyl, $C_{6-8}$ cycloalkanediyl, $C_{6-14}$ alkanecycloalkanediyl, and $—[(—CHR^8—)_s—X—]_q—(—CHR^8—)_r—$, wherein s, q, r, $R^8$, and X are as defined for $R^5$; m is an integer from 0 to 50; n is an integer from 1 to 60; p is an integer from 2 to 6; B represents a core of a z-valent, polyfunctionalizing agent $B(—V)_z$ wherein: z is an integer from 3 to 6; and each V is a group comprising a terminal group reactive with thiol groups; and each $—V—'$ is derived from the reaction of $—V$ with a thiol; and each $R^6$ is independently a moiety comprising a terminal Michael acceptor group.

In prepolymers of Formula (3a) and Formula (3b), $R^5$ can in particular be $—[(—CH_2—)_s—X—]_q—(CH_2)_r—$, where s can be 2, X can be $—O—$, q can be 2, r can be 2, $R^7$ can be ethanediyl, m can be 2, and n can be 9.

In prepolymers of Formula (3a) and Formula (3b), $R^5$ can for instance be selected from $C_{2-6}$ alkanediyl and $—[—(CHR^8)_s—X]—_q—(CHR^8)_r—$.

In prepolymers of Formula (3a) and Formula (3b), $R^5$ can in particular be $—[—(CHR^8)_s—X—]_q—(CHR^8)_r—$, where X is $—O—$ or X is $—S—$.

More specifically, in prepolymers of Formula (3a) and Formula (3b), $R^5$ can be $—[—(CHR^8)_s—X—]_q—(CHR^8)_r—$, wherein s can be 2, r can be 2, q can be 1, and X can be $—S—$; or wherein s can be 2, q can be 2, r can be 2, and X can be $—O—$; or wherein s can be 2, r can be 2, q can be 1, and X can be $—O—$.

Moreover, in prepolymers of Formula (3a) and Formula (3b), where $R^5$ can be $—[—(CHR^8)_s—X—]_q—(CHR^8)_r—$, each $R^8$ or at least one $R^8$ can be methyl.

In prepolymers of Formula (3a) and Formula (3b), each $R^5$ can be the same or at least one $R^5$ can be different.

In prepolymers of Formula (3b), each $—V$ can comprise a terminal alkenyl group.

In adducts of Formula (3a) and Formula (3b), each $R^6$ can independently be selected e.g. from a vinyl ketone, a vinyl sulfone, and a quinone. Each of the Michael acceptor groups may be the same or at least some of the Michael acceptor groups are different from each other.

In adducts of Formula (3a) and Formula (3b), each $R^6$ can likewise independently be a bis(sulfonyl)alkanol group.

In adducts of Formula (3a) and Formula (3b), each $R^6$ can also independently be derived from a bis(sulfonyl)alkanol and have the structure of Formula (4a) or Formula (4b):

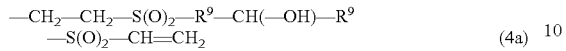

(4a)

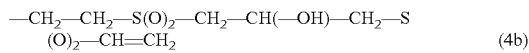

(4b)

where each $R^9$ is independently selected from $C_{1-3}$ alkanediyl.

A Michael acceptor group terminating a sulfur-containing prepolymer useful as polyene in curable compositions according to the present invention is however not particularly limited and may generally be any suitable Michael acceptor group.

In prepolymers of Formula (3a) and Formula (3b), each $R^6$ can for example be derived from a bismaleimide such as 1,1'-(methylenebis(4,1-phenylene)bis(1H-pyrrole-2,5-dione), ethylenebismaleimide, 1,6-bismaleimidohexane, 2,4-dimaleimidotoluene, N,N'-1,3-phenylenedimaleimide; 1,4-bis(maleimido)butane trimethylenebismaleimide; p,p'-dimaleimidodiphenylmethane; pentamethylenebismaleimide 1H-pyrrole-2,5-dione; 1,1'-(1,8-octanediyl)bis-, 1H-pyrrole-2,5-dione, 1,1'-(1,7-heptanediyl)bis-, 4,4'-dithiobis(phenylmaleimide); methylenebis(N-carbamylmaleimide), 1,9-bis(maleimide)nonane; 1,1'-decane-1,10-diylbis(1H-pyrrole-2,5-dione); O-phenylene dimaleimide, bis(N-maleimidomethyl)ether; 1,5-bis(maleimide)-2-methyl-pentane; N,N'-1,4-phenylenedimaleimide; 1,1'-(2-methyl-1,3-phenylene)bis(1H-pyrrole-2,5-dione); Kerimid 601 resin; tetrakis(N-2-aminoethylmaleamide); 1-(2,5-dimethylphenyl)pyrrole-2,5-dione; SureCN331305; SureCN349749; or 1,1'-biphenyl-4,4'-diylbis(1H-pyrrole-2,5-dione).

The Michael acceptor-terminated sulfur-containing prepolymer can comprise at least two terminal maleimide groups.

As already indicated above, the Michael acceptor group can likewise comprise a bis(sulfonyl)alkanol group such as a 1-(ethylenesulfonyl)-n-(vinylsulfonyl)alkanol group, or a 1-(ethylenesulfonyl)-3-(vinylsulfonyl)propan-2-ol group. Each of the Michael acceptor groups of the Michael acceptor-terminated sulfur-containing prepolymer may be the same or at least some of the Michael acceptor groups are different from each other.

A "bis(sulfonyl)alkanol group" refers to a group comprising a moiety of the general formula:

—S(O)$_2$—R$^{10}$—CH(—OH)—R$^{10}$—S(O)$_2$— where each $R^{10}$ is independently selected from $C_{1-3}$ alkanediyl and substituted $C_{1-3}$ alkanediyl, where the one or more substituent groups is —OH. In certain examples, a bis(sulfonyl)alkanol group has the structure:

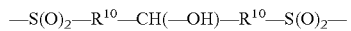

and in certain instances, the structure:

R$^{11}$—S(O)$_2$—R$^{10}$—CH(—OH)—R$^{10}$—S(O)$_2$—R$^{11}$ where each $R^{11}$ is a moiety having a terminal reactive group. Each $R^{11}$ may comprise a terminal group reactive with a thiol group such as, for example, an alkenyl group, an epoxy group, or a Michael acceptor group. In certain instances, a bis(sulfonyl)alkanol may be a bis(vinylsulfonyl)alkanol comprising terminal alkenyl groups. For example, a bis(sulfonyl)alkanol may be a bis(vinylsulfonyl)alkanol in which $R^{11}$ comprises a terminal alkenyl group, such as a compound having the formula:

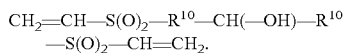

The bis(vinylsulfonyl)alkanol may e.g. comprise 1,3-bis(vinylsulfonyl)-2-propanol. A bis(sulfonyl)alkanol can be prepared by reacting a bis(vinylsulfonyl)alkanol with a compound having a terminal group reactive with the terminal alkenyl groups of the bis(vinylsulfonyl)alkanol such as a thiol group or an epoxy group. In such situations, the bis(sulfonyl)alkanol can have the structure:

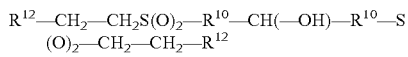

where each $R^{12}$ is a moiety derived from the reaction of the compound with the terminal alkenyl groups of the bis(vinylsulfonyl)alkanol.

A "bis(sulfonyl)alkanol group" can alternatively be a monovalent bis(sulfonyl)alkanol group or a divalent bis(sulfonyl)alkanol group. A monovalent bis(sulfonyl)alkanol group can be a terminal bis(sulfonyl)alkanol group such as a "1-(ethylenesulfonyl)-n-(vinylsulfonyl)alkanol group." A terminal bis(sulfonyl)alkanol group can be derived from the reaction of a bis(sulfonyl)alkanol and can have a terminal moiety with the general structure —R$^{13}$—S(O)$_2$—R$^{15}$—CH(—OH)—R$^{15}$—S(O)$_2$—R$^{14}$ where $R^{13}$ is a moiety derived from the reaction of a bis(sulfonyl)alkanol with a compound having a group reactive with the bis(sulfonyl)alkanol; each $R^{15}$ is independently selected from $C_{1-3}$ alkanediyl, and substituted $C_{1-3}$ alkanediyl, wherein the one or more substituent groups is —OH. $R^{14}$ may be an alkylene group such as —CH═CH$_2$. In certain examples, a terminal bis(sulfonyl)alkanol group is a 1-(ethylenesulfonyl)-n-(vinylsulfonyl)alkanol group such as 1-(ethylenesulfonyl)-3-(vinylsulfonyl)propan-2-ol, i.e., —CH$_2$—CH$_2$—S(O)$_2$—CH$_2$—CH(—OH)—CH$_2$—S(O)$_2$—CH═CH$_2$. A monovalent terminal bis(sulfonyl)alkanol group may e.g. have the structure —CH$_2$—CH$_2$—S(O)$_2$—R$^{15}$—CH(—OH)—R$^{15}$—S(O)$_2$—CH═CH$_2$.

In certain examples, a bis(sulfonyl)alkanol group can also be divalent such as when the group is incorporated into the backbone of a prepolymer such as the polythioethers disclosed herein. A divalent bis(sulfonyl)alkanol group can have the general structure —R$^{13}$—S(O)$_2$—R$^{15}$—CH(—OH)—R$^{15}$—S(O)$_2$—R$^{13}$—; or —CH$_2$—CH$_2$—S(O)$_2$—R$^{15}$—CH(—OH)—R$^{15}$—S(O)$_2$—CH$_2$—CH$_2$—, or —R$^{13}$—S(O)$_2$—CH$_2$—CH(—OH)—CH$_2$—S(O)$_2$—R$^{13}$—, or —CH$_2$—CH$_2$—S(O)$_2$—CH$_2$—CH(—OH)—CH$_2$—S(O)$_2$—CH$_2$—CH$_2$—, where $R^{13}$ and $R^{15}$ are as defined above. Each $R^{13}$ may e.g. be an ethane-diyl group and/or each $R^{15}$ may be methane-diyl.

A "bis(sulfonyl)alkanol-containing" polymer, prepolymer, or adduct refers to a polymer, prepolymer, or adduct in which one or more divalent bis(sulfonyl)alkanol groups are incorporated into the backbone of the polymer, prepolymer, or adduct.

A divalent bis(sulfonyl)alkanol group can be incorporated in a prepolymer by reacting, for example, in a suitable ratio, a polythiol monomer or prepolymer of Formula I with a bis(sulfonyl)alkanol of Formula II:

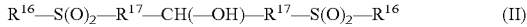

where R is an organic moiety, each $R^{17}$ is independently selected from $C_{1-3}$ alkanediyl and substituted $C_{1-3}$ alkanediyl, wherein the one or more substituent groups is —OH; w is an integer of at least 2 and each $R^{16}$ comprises a terminal group that is reactive with a thiol group such as, for example, an alkylene group, and epoxy group, or a group comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc. In certain situations, a bis(sulfonyl)alkanol of Formula II may be a bis(vinylsulfonyl)alkanol having the formula

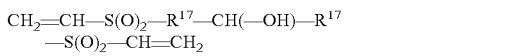

where each $R^{17}$ is as defined above. A suitable bis(sulfonyl) alkanol may for instance be exemplified by 1,3-bis(vinylsulfonyl)-2-propanol. Alternatively, a bis(sulfonyl)alkanol group can be incorporated into a prepolymer backbone by reacting, in a suitable ratio, a thiol-capped bis(sulfonyl)alkanol of Formula III with a reactant of Formula IV:

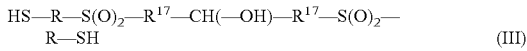

where each R is a divalent moiety, each $R^{17}$ is as defined herein, and each R" comprises a terminal group that is reactive with a thiol group such as, for example, an alkenyl group, an epoxy group, or a group consisting of a saturated carbon bearing a leaving group that are well known for nucleophilic substitution such as, for example, —Cl, —Br, —I, —OSO$_2$CH$_3$ (mesylate), —OSO$_2$—C$_6$H$_4$—CH$_3$ (tosylate), etc.

By choosing the appropriate ratio of the reactants of Formula I and Formula II, or Formula III and Formula IV, one or more bis(sulfonyl)alkanol groups can be incorporated into a prepolymer as either a chain segment, as part of a terminal bearing a reactive group, or both. For example, bis(vinylsulfonyl)alkanol can be used to introduce one or more 1,n-bis(ethylenesulfonyl)alkanol groups into the backbone of a prepolymer chain, one or more terminal 1-(ethylenesulfonyl)-n-(vinylsulfonyl)alkanol groups, or both.

It may be desirable to react bis(vinylsulfonyl)-2-propanol with thiol-capped monomers/polymers to incorporate 1,3-bis(ethylenesulfonyl)-2-propanol groups into the polymer chain.

Bis(vinylsulfonyl)-2-propanol can likewise be reacted with thiol-capped monomers/polymers to provide 1-(ethylenesulfonyl)-3-(vinylsulfonyl)-2-propanol terminal groups, where the terminal alkenyl group is a well-recognized Michael acceptor.

A moiety derived from the reaction of a bis(sulfonyl) alkanol with a thiol group refers to the reaction product of a thiol group and a moiety containing a terminal group reactive with the thiol group. Examples of terminal groups reactive with thiol groups include epoxy groups, ethylene groups, and Michael acceptor groups. In certain examples, a moiety derived from the reaction of a bis(sulfonyl)alkanol with a thiol group has the structure: —CH$_2$—CH$_2$—R—, —CH(—OH)—CH$_2$—R—, —CH$_2$—CH(—OH)—R—, or —CH$_2$—CH$_2$—SO$_2$—R—, where R refers to a covalent bond or an organic moiety bonded to a sulfonyl group.

Michael acceptor-terminated sulfur-containing prepolymers useful as polyene (a) in the curable compositions according to the present invention may for instance comprise at least two terminal 1-(ethylenesulfonyl)-n-(vinylsulfonyl)alkanol groups, such as two terminal 1-(ethylenesulfonyl)-n-(vinylsulfonyl)alkanol groups, 3, 4, 5, or 6 terminal 1-(ethylenesulfonyl)-n-(vinylsulfonyl)alkanol groups. A Michael acceptor-terminated sulfur-containing prepolymer may comprise a combination of adducts having different numbers of terminal 1-(ethylenesulfonyl)-n-(vinylsulfonyl)alkanol groups characterized, for example, by an average 1-(ethylenesulfonyl)-n-(vinylsulfonyl)alkanol functionality from 2.05 to 6, from 2.1 to 4, from 2.1 to 3, from 2.2 to 2.8, or from 2.4 to 2.6.

A Michael acceptor group, which can be present in polyenes that can be used in the curable composition according to the present invention, can also be derived from a vinyl sulfone and have the structure of Formula (5):

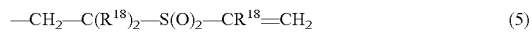

wherein each $R^{18}$ is independently selected from hydrogen and $C_{1-3}$ alkyl. In Michael acceptor groups of Formula (5), each $R^{18}$ can e.g. be hydrogen. Michael acceptor-terminated bis(sulfonyl)alkanol-containing polythioethers may be prepared, for example, by reacting a thiol-terminated bis(sulfonyl)alkanol-containing polythioether with a compound having a terminal Michael acceptor group and a group reactive with thiol groups such as a divinylsulfone, in the presence of a phosphine catalyst. Michael acceptor/polythioether chemistries and compounds are disclosed, for example, in U.S. Application Publication No. 2013/0345371.

Michael acceptor-terminated sulfur-containing prepolymers used as polyene in curable compositions according to the present invention can comprise at least two terminal vinylsulfonyl groups.

In certain examples, the Michael acceptor-terminated sulfur-containing prepolymers can be terminated by at least two vinyl sulfonyl groups or at least two terminal 1-(ethylenesulfonyl)-n-(vinylsulfonyl)alkanol groups.

A compound having a Michael acceptor group and a group that is reactive with the terminal groups of the sulfur-containing polymer may be a bis(sulfonyl)alkanol having the formula R—CH$_2$—CH$_2$—S(O)$_2$—R$^{19}$—CH(—OH)—R$^{19}$—S(O)$_2$—CH=CH$_2$ where R can be a moiety having a terminal group that is reactive with the terminal groups of the sulfur-containing polymer; and each $R^{19}$ is independently selected from $C_{1-3}$ alkanediyl. A bis(vinyl) alkanol can be a bis(vinylsulfonyl)alkanol.

Sulfur-containing maleimide adducts provided by the present disclosure can comprise at least two terminal maleimide groups. A sulfur-containing maleimide adduct may comprise a mixture of sulfur-containing maleimide adducts having different functionalities characterized by an average functionality from 2.05 to 6, from 2.1 to 4, from 2.1 to 3, from 2.2 to 2.8, or from 2.4 to 2.6. Sulfur-containing maleimide adducts can have at least two terminal maleimide groups, or can have two terminal 1-(4-(4-(3-yl-2,5-dioxopyrrolidin-1-yl)benzyl)phenyl)-1H-pyrrole-2,5-dione groups, or can have more than two terminal groups such as 3, 4, 5, or 6 terminal 1-(4-(4-(3-yl-2,5-dioxopyrrolidin-1-yl)benzyl) phenyl)-1H-pyrrole-2,5-dione groups. A sulfur-containing maleimide adduct may comprise a combination of adducts having different numbers of terminal 1-(4-(4-(3-yl-2,5-dioxopyrrolidin-1-yl)benzyl)phenyl)-1H-pyrrole-2,5-dione groups characterized, for example, by an average 1-(4-(4-

(3-yl-2,5-dioxopyrrolidin-1-yl)benzyl)phenyl)-1H-pyrrole-2,5-dione functionality from 2.05 to 6, from 2.1 to 4, from 2.1 to 3, from 2.2 to 2.8, or from 2.4 to 2.6.

The double bond of maleimides can react with thiol groups at pH 6.5 to 7.5 and is more reactive than (meth) acrylates. At neutral pH, the reaction of maleimides with thiols is about 1,000 times faster than the reaction of maleimides with amines. Compositions prepared from maleimide resins exhibit excellent thermomechanical stability and anti-flammability.

A maleimide-terminated sulfur-containing prepolymer can comprise a polythioether maleimide prepolymer characterized by a polythioether having at least two terminal maleimide groups such as, for example, at least two terminal 1-(4-(4-(3-yl-2,5-dioxopyrrolidin-1-yl)benzyl)phenyl)-1H-pyrrole-2,5-dione groups.

Terminal Michael acceptor groups can be selected from 1,3-bis(vinylsulfonyl)-2-propanol, 1,1'-(methylenedi-4,1-phenylene)bismaleimide, or a combination thereof.

A sulfur-containing maleimide adduct useful as polyene (a) in curable compositions according to the present invention can comprise a polythioether maleimide adduct comprising:
(a) a backbone comprising the structure of Formula (6):

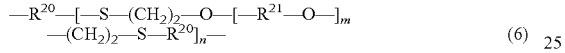   (6)

where (i) each $R^{20}$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $-[(-CHR^{22}-)_p-X-]_q-(CHR^{22})_r-$ group, wherein each $R^{22}$ is independently selected from hydrogen and methyl; (ii) each $R^{21}$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $-[(-CH_2-)_p-X-]_q-(CH_2)_r-$ group; (iii) each X is independently selected from O, S, and a $-NR^{23}-$ group, in which $R^{23}$ is selected from H and a methyl group; (iv) m is an integer ranging from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two terminal maleimide groups, which can e.g. be individually selected from any of the terminal maleimide groups described herein.

In an adduct of Formula (6), $R^{20}$ can for instance be $-[(-CHR^{22})_p-X-]_q-(CHR^{22})_r-$ wherein each X is independently selected from $-O-$ and $-S-$.

More specifically, in an adduct of Formula (6), $R^{20}$ can be $-[(-CH_2)_p-X-]_q-(CH_2)_r-$ wherein each X is independently selected from $-O-$ and $-S-$, wherein often each X is $-O-$ or each X is $-S-$.

Even more specifically, in adducts of Formula (6), $R^{20}$ can be $-[(-CH_2-)_p-X-]_q-(CH_2)_r-$, wherein p can be 2, X can be O, q can be 2, r can be 2, $R^{21}$ can be ethanediyl, m can be 2, and n can be 9.

A terminal maleimide group can have the structure of Formula (7):

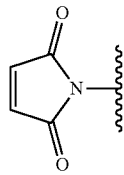   (7)

A terminal bismaleimide moiety refers to a moiety having a terminal maleimide group. A terminal maleimide group can be derived from a bismaleimide, such as a compound having the structure of Formula (8a):

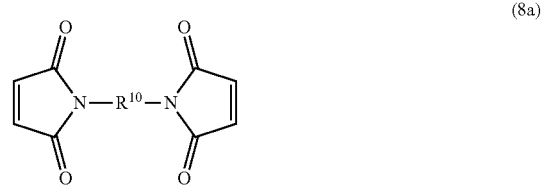   (8a)

where $R^{10}$ is a divalent organic moiety, and the terminal group can have the structure of Formula (8b):

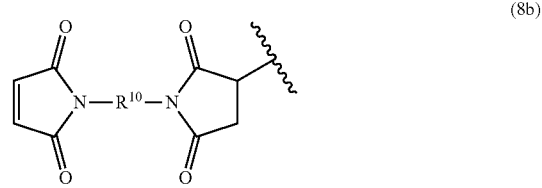   (8b)

and is referred to herein as a 1-(4-(4-(3-yl-2,5-dioxopyrrolidin-1-yl)benzyl)phenyl)-1H-pyrrole-2,5-dione group. A terminal maleimide group can be derived from 1,1'-(methylenedi-4,1-phenylene)bismaleimide of Formula (9a), also referred to as 1,1'-(methylenebis(4,1-phenylene)bis(1H-pyrrole-2,5-dione), and the terminal group can have the structure of Formula (9b):

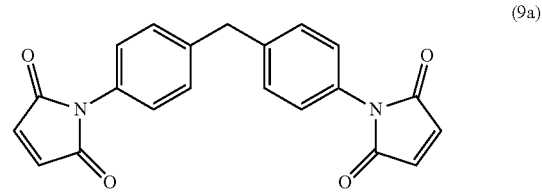   (9a)

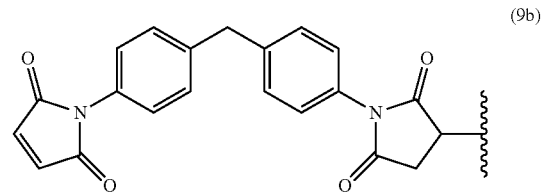   (9b)

A maleimide group can comprise a 1-(4-(4-(3-yl-2,5-dioxopyrrolidin-1-yl)benzyl)phenyl)-1H-pyrrole-2,5-dione group. Each of the terminal maleimide groups may be the same or at least some of the terminal maleimide groups are different from each other.

Other examples of compounds having two or more maleimide groups include ethylenebismaleimide; 1,6-bismaleimidohexane; 2,4-dimaleimidotoluene, N,N'-3-phenylenedimaleimide; 1,4-bis(maleimido)butane trimethylenebismaleimide; p,p'-dimaleimidodiphenylmethane; pentamethylenebismaleimide 1H-pyrrole-2,5-dione; 1,1'-(1,8-octanediyl)bis-, 1H-pyrrole-2,5-dione, 1,1'-(1,7-heptanediyl)bis-, 4,4'-dithiobis(phenylmaleimide); methylenebis(N-carbamylmaleimide), 1,9-bis(maleimide)nonane;

1,1'-decane-1,10-diylbis(1H-pyrrole-2,5-dione); O-phenylene dimaleimide, bis(N-maleimidomethyl)ether; 1,5-bis(maleimide)-2-methyl-pentane; N,N'-1,4-phenylenedimaleimide; 1,1'-(2-methyl-1,3-phenylene)bis(1H-pyrrole-2,5-dione); Kerimid 601 resin; tetrakis(N-2-aminoethylmaleimide); 1-(2,5-dimethylphenyl)pyrrole-2,5-dione; SureCN331305, SureCN349749; or 1,1'-biphenyl-4,4'-diylbis(1H-pyrrole-2,5-dione).

To prepare a Michael acceptor-terminated sulfur-containing prepolymer, a sulfur-containing prepolymer such as those disclosed herein may be reacted with a compound having a Michael acceptor group and a group that is reactive with the terminal groups of the sulfur-containing prepolymer.

A Michael acceptor group can, for example, be selected from a vinyl ketone, a vinyl sulfone, a maleimide, and a quinone. In compounds in which a Michael acceptor group is derived from divinyl sulfone, the sulfur-containing prepolymer may be thiol-terminated such as a thiol-terminated polythioether, a thiol-terminated polysulfide, or a combination thereof.

The polyene (a) is typically present in the curable composition of the present invention in an amount of at least 10 but less than 90 percent by weight, based on the total weight of components (a) and (b) in the curable composition. For example, the polyene (a) may be present in the curable composition in an amount of at least 10 percent by weight, often at least 30 percent by weight, or at least 50 percent by weight, or even at least 60 percent by weight, based on the total weight of components (a) and (b) in the curable composition, as demonstrated in the examples below. Moreover, the polyene (a) may be present in the curable composition in an amount of up to 75 percent by weight, often up to 60 percent by weight, based on the total weight of components (a) and (b) in the curable composition.

Curable compositions of the present invention further include (b) a polythiol. As used herein the term "polythiol" refers to compounds containing two or more thiol functional groups (—SH). Suitable polythiols (b) for use in the curable composition according to the present invention are numerous and can vary widely. Such polythiols can include those that are known in the art. Examples of suitable polythiols can include, but are not limited to, polythiols having at least two thiol groups including monomeric compounds, oligomers, prepolymers and polymers. The polythiol can have ether linkages (—O—), thioether linkages (—S—), including polysulfide linkages (—S$_x$—), wherein x is at least 2, such as from 2 to 4, and combinations of such linkages.

The polythiols (b) for use in the present invention include materials of the formula:

$$R^{24}—(SH)_n$$

wherein $R^{24}$ is an organic moiety and n is an integer of at least 2, typically 2 to 6. Such polythiol may for instance comprise a reaction product of a thiol-functional organic acid and a polyol. Accordingly, the organic moiety $R^{24}$ can contain ester groups and/or be derived from a polyol.

Examples of suitable polythiols that can be used in the curable compositions according to the present invention may thus e.g. include esters of thiol-containing acids of the formula HS—$R^{25}$—COOH, wherein $R^{25}$ is an organic moiety, with polyhydroxy compounds of the structure $R^{26}$—(OH)$_n$ wherein $R^{26}$ is an organic moiety and n is at least 2, typically 2 to 6. The thiol-containing acid component and the polyhydroxy component can be reacted under suitable conditions to give polythiols having the general structure:

$$R^{26}—(OC(=O)—R^{25}—SH)_n$$

Examples of such esters of thiol-containing acids include esters of thioglycolic acid (HS—CH$_2$COOH), α-mercaptopropionic acid (HS—CH(CH$_3$)—COOH) or β-mercaptopropionic acid (HS—CH$_2$CH$_2$COOH) with polyhydroxy compounds such as glycols, triols, tetraols, pentaols, hexaols, and mixtures thereof. Specific examples of suitable polythiols include for instance ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

A suitable polythiol (b) for use in curable compositions according to the present invention particularly useful for the aerospace industry may include a thiol-terminated sulfur-containing prepolymer such as a thiol-terminated polythioether prepolymer, a thiol-terminated polysulfide prepolymer, a thiol-terminated sulfur-containing polyformal prepolymer, or combinations of any of the foregoing. The thiol-terminated sulfur-containing prepolymer may also comprise a mixture of different polythioethers and/or polysulfides, and the polythioethers and/or polysulfides may have the same or different thiol functionality. A thiol-terminated sulfur-containing prepolymer can have an average thiol functionality from 2 to 6, from 2 to 4, from 2 to 3, or from 2.05 to 2.8. For example, a thiol-terminated sulfur-containing prepolymer can comprise a difunctional thiol-terminated sulfur-containing polymer, a trifunctional thiol-terminated sulfur-containing polymer, or a combination thereof.

Examples of suitable thiol-terminated polythioether prepolymers for use in curable compositions provided by the present disclosure are disclosed, for example, in U.S. Pat. No. 6,172,179.

A thiol-terminated sulfur-containing prepolymer suitable as polythiol (b) in the curable compositions according to the present invention can e.g. comprise a backbone comprising the structure of Formula (10):

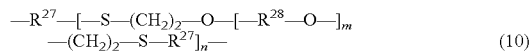

(10)

wherein:

(i) each $R^{27}$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, and a —[(—CHR$^{29}$—)$_p$—X—]$_q$—(CHR$^{29}$)$_r$— group, wherein each $R^{29}$ is selected from hydrogen and methyl;

(ii) each $R^{28}$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, and a —[(—CH$_2$—)$_p$—X—]$_q$—(CH$_2$)$_r$— group;

(iii) each X is independently selected from O, S, —NH— and —N(—CH$_3$)—;

(iv) m is an integer ranging from 0 to 50;

(v) n is an integer ranging from 1 to 60;

(vi) p is an integer ranging from 2 to 6;

(vii) q is an integer ranging from 1 to 5; and (viii) r is an integer ranging from 2 to 10.

A thiol-terminated sulfur-containing prepolymer suitable as polythiol (b) in the curable compositions according to the present invention can e.g. comprise a thiol-terminated polythioether prepolymer of Formula (11a), a thiol-terminated polythioether prepolymer of Formula (11b), or a combination thereof:

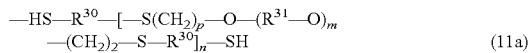
(11a)

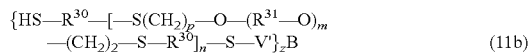
(11b)

wherein:
each $R^{30}$ independently is selected from $C_{2-10}$ alkanediyl, $C_{6-8}$ cycloalkanediyl, $C_{6-14}$ alkanecycloalkanediyl, $C_{6-8}$ heterocycloalkanediyl, and $-[(-CHR^{32})_s-X-]_q-(-CHR^{32})_r-$, wherein:
s is an integer from 2 to 6; q is an integer from 1 to 5; r is an integer from 2 to 10; each $R^{32}$ is independently selected from hydrogen and methyl; and each X is independently selected from $-O-$, $-S-$, $-NH-$ and $-N(-CH_3)-$; each $R^{31}$ is independently selected from $C_{1-10}$ alkanediyl, $C_{6-8}$ cycloalkanediyl, $C_{6-14}$ alkanecycloalkanediyl, and $-[(-CHR^{32})_s-X-]_q-(-CHR^{32})_r-$, wherein s, q, r, $R^{32}$, and X are as defined as for $R^{30}$; m is an integer from 0 to 50; n is an integer from 1 to 60; p is an integer from 2 to 6; B represents a core of a z-valent, vinyl-terminated polyfunctionalizing agent B(V), wherein: z is an integer from 3 to 6; and each $-V$ is a group comprising a terminal vinyl group; and each $-V-'$ is derived from the reaction of V with a thiol.

In prepolymers of Formula (11a) and Formula (11b), $R^{30}$ can for instance be $-[(-CH_2-)_s-X-]_q-(CH_2)_r-$, where s can be 2, X can be $-O-$, q can be 2, r can be 2, $R^2$ can be ethanediyl, m can be 2, and n can be 9.

In prepolymers of Formula (11a) and Formula (11b), $R^{30}$ can be selected from $C_{2-6}$ alkanediyl and $-[-(CHR^{32})_s-X-]_q-(CHR^{32})_r-$.

In prepolymers of Formula (11a) and Formula (11b), $R^{30}$ can in particular be $-[-(CHR^{32})_s-X-]_q-(CHR^{32})_r-$, wherein X is $-O-$ or X is $-S-$.

In specific prepolymers of Formula (11a) and Formula (11b), $R^{30}$ can be $-[-(CHR^{32})_s-X-]_q-(CH R^{32})_r-$, wherein s is 2, r is 2, q is 1, and X is $-S-$; or s is 2, q is 2, r is 2, and X is $-O-$; or s is 2, r is 2, q is 1, and X is $-O-$.

Furthermore, in prepolymers of Formula (11a) and Formula (11b), $R^{30}$ can be $-[-(CHR^{32})_s-X-]_q-(CH R^{32})_r-$, wherein each $R^{32}$ is hydrogen or at least one $R^{32}$ is methyl.

In prepolymers of Formula (11a) and Formula (11b), each $R^{30}$ can generally be the same, or at least one $R^{30}$ can be different.

Various methods can be used to prepare the thiol-terminated polythioether prepolymers useful as polythiol in the curable compositions according to the present invention. Examples of suitable thiol-terminated polythioether prepolymers, and methods for their production, are described, for example, in U.S. Pat. No. 6,172,179. The thiol-terminated polythioether prepolymers may be difunctional, such as linear prepolymers having two thiol terminal groups, or polyfunctional, such as branched prepolymers having three or more terminal thiol groups. Thiol-terminated polythioether prepolymers may also comprise a combination of difunctional and polyfunctional thiol-terminated polythioether prepolymers. Suitable thiol-terminated polythioether prepolymers are commercially available, for example, as Permapol® P3.1E, from PRC-Desoto International Inc., Sylmar, Calif.

Suitable difunctional thiol-terminated polythioether prepolymers may be produced by reacting a divinyl ether or mixtures of divinyl ethers with an excess of dithiol or a mixture of dithiols. For example, dithiols suitable for use in preparing thiol-terminated polythioether prepolymers include those having the structure of Formula (12), other dithiols disclosed herein, or combinations of any of the dithiols disclosed herein.

A dithiol useful in preparing a thiol-terminated polythioether provided by the present disclosure can e.g. have the structure of Formula (12):

(12)

wherein: $R^{33}$ is selected from $C_{2-6}$ alkanediyl, $C_{6-8}$ cycloalkanediyl, $C_{6-10}$ alkanecycloalkanediyl, $C_{6-8}$ heterocycloalkanediyl, and $-[-(CHR^{34})_p-X-]_q-(CHR^{34})_r-$; wherein: each $R^{34}$ is independently selected from hydrogen and methyl; each X is independently selected from $-O-$, $-S-$ and $-NR-$ wherein R is selected from hydrogen and methyl; p is an integer from 2 to 6; q is an integer from 1 to 5; and r is an integer from 2 to 10.

In dithiols of Formula (12), $R^{33}$ can in particular be $-[-(CHR^{34})_p-X-]_q-(CHR^{34})_r-$.

In dithiols of Formula (12), X can in particular be $-O-$ or $-S-$, and thus $-[-(CHR^{34})_p-X-]_q-(CHR^{34})_r-$ in Formula (12) can be $-[-(CHR^{34})_p-O-]_q-(CHR^{34})_r-$ or $-[-(CHR^{34})_p-S-]_q-(CHR^{34})_r-$. In moieties having the structure $-[-(CHR^{34})_p-X-]_q-(CHR^{34})_r-$, p and r can be the same, such as both p and r can be two.

In dithiols of Formula (12), $R^{33}$ can for instance be $C_{2-6}$ alkanediyl or $-[-(CHR^{34})_p-X-]_q-(CHR^{34})_r-$.

In dithiols of Formula (12), where $R^{33}$ is $-[-(CHR^{34})_p-X-]_q-(CHR^{34})_r-$, in particular X can be $-O-$ or X can be $-S-$.

In dithiols of Formula (12), $R^{33}$ can e.g. be $-[-(CHR^{34})_p-X-]_q-(CHR^{34})_r-$, wherein p can be 2, r can be 2, q can be 1, and X can be $-S-$; or p can be 2, q can be 2, r can be 2, and X can be $-O-$; or p can be 2, r can be 2, q can be 1, and X can be $-O-$.

In dithiols of Formula (12), $R^{33}$ can e.g. be $-[-(CHR^{34})_p-X-]_q-(CHR^{34})_r-$, wherein each $R^{34}$ is hydrogen or at least one $R^{34}$ is methyl.

Specific non-limiting examples of suitable dithiols useful in preparing the thiol-terminated polythioether prepolymer include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower (e.g., $C_{1-6}$) alkoxy group, and a hydroxyl group. Suitable alkyl pendant groups include, for example, $C_{1-6}$ linear alkyl, $C_{3-6}$ branched alkyl, cyclopentyl, and cyclohexyl.

Thus, it is also possible to use dithiols that include both heteroatoms in the carbon backbone and pendant alkyl groups, such as methyl groups. Such compounds include, for example, methyl-substituted DMDS, such as $HS-CH_2CH(CH_3)-S-CH_2CH_2-SH$, $HS-CH(CH_3)CH_2-S-CH_2CH_2-SH$ and dimethyl substituted DMDS, such as $HS-CH_2CH(CH_3)-S-CH(CH_3)CH_2-SH$ and $HS-CH(CH_3)CH_2-S-CH_2CH(CH_3)-SH$.

Suitable divinyl ethers for use in preparing the polythioether prepolymers include, for example, divinyl ethers of Formula (13):

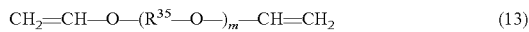

where $R^{35}$ in Formula (13) can be $C_{2-6}$ n-alkanediyl, $C_{3-6}$ branched alkanediyl, $C_{6-8}$ cycloalkanediyl, $C_{6-10}$ alkanecycloalkanediyl, or —[(—CH$_2$)$_p$—O—]$_q$—(CH$_2$)$_r$—, where p is an integer ranging from 2 to 6, q is an integer from 1 to 5, and r is an integer from 2 to 10.

Suitable divinyl ethers include, for example, divinyl ethers having at least one oxyalkanediyl group, such as from 1 to 4 oxyalkanediyl groups, i.e., compounds in which m in Formula (13) is an integer ranging from 1 to 4. In divinyl ethers of Formula (13), m can e.g. be an integer ranging from 2 to 4. It is also possible to employ commercially available divinyl ether mixtures that are characterized by a non-integral average value for the number of oxyalkanediyl units per molecule. Thus, m in Formula (13) can also take on rational number values ranging from 0 to 10.0, such as from 1.0 to 10.0, from 1.0 to 4.0, or from 2.0 to 4.0.

Specific non-limiting examples of suitable divinyl ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, cyclohexanedimethanol divinyl ether, polytetrahydrofuryl divinyl ether and combinations of two or more such divinyl ether monomers. The divinyl ether may optionally have one or more pendant groups selected from alkyl groups, hydroxyl groups, alkoxy groups, and amine groups.

In divinyl ethers of Formula (13) $R^{35}$ can e.g. be $C_{3-6}$ branched alkanediyl, which may be prepared by reacting a polyhydroxy compound with acetylene. Examples of divinyl ethers of this type include compounds in which $R^{35}$ in Formula (13) is an alkyl-substituted methanediyl group such as —CH(CH$_3$)— (for example Pluriol® blends such as Pluriol® E-200 divinyl ether (BASF Corp., Parsippany, N.J.), for which $R^{35}$ in Formula (13) is ethanediyl and m is 3.8) or an alkyl-substituted ethanediyl (for example —CH$_2$CH(CH$_3$)— such as DPE polymeric blends including DPE-2 and DPE-3; International Specialty Products, Wayne, N.J.).

Other useful divinyl ethers include divinyl ethers in which $R^{35}$ in Formula (13) is polytetrahydrofuryl (poly-THF) or polyoxyalkanediyl, such as those having an average of about 3 monomer units.

Two or more types of dithiols and/or of divinyl ether monomers of Formula (13) may be used in the preparation of the thiol-terminated polythioether prepolymers. Thus, for instance two dithiols of Formula (12) and one divinyl ether monomer of Formula (13), one dithiol of Formula (12) and two divinyl ether monomers of Formula (13), two dithiols of Formula (12) and two divinyl ether monomers of Formula (13), and more than two dithiols of Formula (12) and two divinyl ethers of Formula (13), may be used to produce a variety of thiol-terminated polythioether prepolymers.

The divinyl ether monomer can comprise from 20 mole percent to less than 50 mole percent of the reactants used to prepare the thiol-terminated polythioether prepolymer, or from 30 mole percent to less than 50 mole percent.

The relative amounts of dithiols and divinyl ethers can be selected to yield polythioether prepolymers having terminal thiol groups. Thus, a dithiol of Formula (12) or a mixture of at least two different dithiols of Formula (12), can be reacted with of a divinyl ether of Formula (13) or a mixture of at least two different divinyl ethers of Formula (13) in relative amounts such that the molar ratio of thiol groups to vinyl groups is greater than 1:1, such as 1.1 to 2.0:1.0.

Thiol-terminated polythioether prepolymers provided by the present disclosure may be prepared by combining at least one dithiol of Formula (12) and at least one divinyl ether of Formula (13) followed by addition of an appropriate catalyst, and carrying out the reaction at a temperature from 30° C. to 120° C., such as 70° C. to 90° C., for a time from 2 hours to 24 hours, such as 2 hours to 6 hours.

Thiol-terminated polythioether prepolymers may also comprise a higher functional polythioether, i.e., may have an average thiol functionality of greater than 2.0. Suitable higher functional thiol-terminated polythioether prepolymers include, for example, those having the structure of Formula (14):

where (i) A comprises a divalent linking group, (ii) B denotes a z-valent residue of a polyfunctionalizing agent; and (iii) z can have an average value of greater than 2.0, such as an average value between 2 and 3, an average value between 2 and 4, an average value between 3 and 6, or can be an integer from 3 to 6.

Polyfunctionalizing agents suitable for use in preparing such higher functional thiol-terminated prepolymers include trifunctionalizing agents where z is 3. Suitable trifunctionalizing agents include, for example, triallyl cyanurate (TAC), 1,2,3-propanetrithiol, isocyanurate-containing trithiols, and combinations thereof, as disclosed in U.S. Application Publication No. 2010/0010133. Other useful polyfunctionalizing agents include trivinyl ether monomers, such as trimethylolpropane trivinyl ether; tetrafunctional ether monomers, such as pentaerythritol tetravinyl ether, and the polythiols described in U.S. Pat. Nos. 4,366,307; 4,609,762; and 5,225,472. Mixtures of polyfunctionalizing agents may also be used.

As a result, thiol-terminated polythioether prepolymers provided by the present disclosure can be characterized by a wide range of average thiol functionality. For example, a combination of difunctional prepolymers and trifunctional prepolymers may afford average thiol functionalities from 2.05 to 3.0, such as from 2.1 to 2.6. Wider ranges of average thiol functionality may be achieved by using tetrafunctional or higher functionality polyfunctionalizing agents. Functionality may also be influenced by factors such as stoichiometry.

Thiol-terminated polythioether prepolymers having a functionality greater than 2.0 may be prepared in a manner similar to the difunctional thiol-terminated polythioether prepolymers described in U.S. Application Publication No. 2010/0010133. For example, thiol-terminated polythioether prepolymers may be prepared by combining (i) one or more dithiols described herein, with (ii) one or more divinyl ethers described herein, and (iii) one or more polyfunctionalizing agents such as any of those mentioned above. The mixture may then be reacted, optionally in the presence of a suitable catalyst, to afford a thiol-terminated polythioether prepolymer having a functionality greater than 2.0.

Thiol-terminated polythioether prepolymers provided by the present disclosure represent thiol-terminated polythioether prepolymers having a molecular weight distribution. For example, useful thiol-terminated polythioether prepolymers can be characterized by a number average molecular weight ranging from 500 Daltons to 20,000 Daltons, from 2,000 Daltons to 5,000 Daltons, or from 3,000 Daltons to 4,000 Daltons. Useful thiol-terminated polythioether prepolymers can exhibit a polydispersity ($M_w/M_n$; weight average molecular weight/number average molecular weight) ranging, for example, from 1 to 20, or from 1 to 5. The molecular weight distribution of thiol-terminated polythioether prepolymers may be characterized by gel permeation chromatography.

As mentioned above, also thiol-terminated polysulfides can be used as polythiol (b) in curable compositions according to the present invention. Herein, "polysulfides" may refer to prepolymers that contain one or more sulfide linkages, i.e., —$S_x$— linkages, where x is from 2 to 4, in the polymer backbone and/or in pendant positions on the prepolymer chain. A polysulfide prepolymer can have two or more sulfur-sulfur linkages. Suitable thiol-terminated polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. Examples of suitable thiol-terminated polysulfides are disclosed in U.S. Pat. No. 4,623,711.

Thiol-terminated sulfur-containing polyformal prepolymers, which can be used as polythiol (b) in curable compositions according to the present invention for aerospace sealant applications are disclosed, for example, in U.S. Application Publication No. 2012/0234205 and in U.S. Application Publication No. 2012/0238707.

Thiol-terminated sulfur-containing prepolymers useful as polythiol in the curable compositions according to the present invention can comprise a metal ligand-containing thiol-terminated sulfur-containing prepolymer in which a metal ligand is incorporated into the backbone of the prepolymer. Metal ligand-containing sulfur-containing prepolymers are disclosed in U.S. Application Publication Nos. 2014/0275474, 2014/0378650, and 2014/0378649.

The polythiol (b) is typically present in the curable composition of the present invention in an amount greater than 10 percent by weight to 90 percent by weight, based on the total weight of components (a) and (b) in the curable composition. For example, the polythiol (b) may be present in the curable composition in an amount of at least 10 percent by weight, often at least 30 percent by weight, or at least 50 percent by weight, or even at least 60 percent by weight, based on the total weight of components (a) and (b) in the curable composition, as demonstrated in the examples below. Moreover, the polythiol (b) may be present in the curable composition in an amount up to 75 percent by weight, often up to 60 percent by weight, based on the total weight of components (a) and (b) in the curable composition. Typically, the equivalent ratio of thiol functional groups in the polythiol (b) to ethylenically unsaturated groups in the polyene (a) is from 0.1 to 10:1, such as from 0.4 to 1.6:1.

Curable compositions of the present invention further comprise (c) any of the catalytic compositions described herein. The metal compound (i) of the catalytic composition is typically present in the curable composition according to the present invention in amounts of 1 to 1000 ppm metal, such as 5 to 175 ppm metal, or 15 to 75 ppm metal, often 25 ppm metal, based on the total weight of components (a) and (b) in the curable composition. The compound (ii) is typically present in the curable composition according to the present invention in amounts of 0.001 to 10 percent by weight, such as 0.01 to 5 percent by weight based on the total weight of components (a) and (b) in the curable composition.

When preparing the curable composition according to the present invention, both components of the catalytic composition (c) may be added as a single package to one or more of the remaining components of the curable composition (i. e., added to (a) and/or (b)). Alternatively, one or more of each component of the catalytic composition (c) may be added in separate packages to one or more components of the curable composition.

Optional ingredients, such as plasticizers, anti-oxidants, thixotropic agents, reactive diluents, hindered amine light stabilizers, UV light absorbers and stabilizers may be formulated into the curable compositions of the present invention. These ingredients may be present (on an individual basis) in amounts up to 30 percent by weight, often from 0.1 to 5 percent by weight, based on the total weight of components (a) and (b) in the curable composition.

Other optional ingredients such as colorants are often included in the curable compositions of the present invention. Examples of suitable pigments and/or pigment compositions include carbazole dioxazine crude pigment, azo, monoazo, disazo, naphthol AS, salt type (lakes), benzimidazolone, condensation, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), carbon black, and mixtures thereof. The terms "pigment" and "colored filler" can be used interchangeably.

Example dyes include those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

When present, pigments are typically used in the curable composition according to the present invention in amounts of up to 80, such as 1 to 80 percent by weight based on total solids weight of the composition.

The curable compositions of the present invention typically contain a diluent to dissolve and/or disperse the various ingredients in the composition. Examples of suitable diluents include, but are not limited to organic materials including aromatic materials such as toluene and xylene, esters such as butyl acetate and amyl acetate, ethers such as dialkyl ethers of ethylene and propylene glycol, and ketones such as methyl ethyl ketone and methyl amyl ketone. Other suitable diluents include water and water miscible solvents such as alcoholic solvents and ethers.

In certain examples of the present invention, the curable compositions of the present invention are essentially free of vanadium compounds, free radical polymerization initiators such as peroxides and others known in the art of addition polymerization, and reactive compounds comprising acid-functional groups, anhydride groups, or reaction products of an active hydrogen compound with an anhydride or polyacid.

The curable compositions according to the present invention may be formulated to a solids content of 1 to 100 percent by weight, such as 20 to 90 percent by weight, or 20 to 80 percent by weight, based on the total weight of the composition.

The ingredients of the composition are typically mixed with one another with low shear mixing to form the curable composition. When pigments are present, they are usually ground with high shear mixing in one of the resinous ingredients of the composition such as the polyene (a) or polythiol (b) to form a pigment paste that then is incorporated into the composition with low shear mixing.

The curable compositions are useful as sealants or as protective or decorative coating compositions and may be used as primer coats or topcoats including color coats and clear coats. The compositions are curable at low, such as ambient, temperatures, as low as −10 to 80° C., or may be subjected to higher temperatures to effect cure, though higher temperatures are usually not necessary. The compositions find particular utility in the original manufacture or refinish of automobiles and trucks. Other uses of the compositions can include but are not limited to various transportation and protective coatings.

The curable compositions of the present invention may be applied over any of a variety of substrates such as metallic, glass, wood, and/or polymeric substrates, and can be applied by conventional methods including, but not limited to, brushing, dipping, flow coating, spraying and the like. The substrates may be bare, pretreated, or coated with a primer and/or sealer. The curable compositions are most often applied to the substrate by spraying. The usual spray techniques and equipment for air spraying, airless spraying, and electrostatic spraying employing manual and/or automatic methods can be used. Suitable substrates include metal substrates such as ferrous metals, zinc, copper, magnesium, aluminum, aluminum alloys, and other metal and alloy substrates such as those typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as Galvanneal, and combinations thereof. Combinations or composites of ferrous and non-ferrous metals can also be used.

The curable compositions of the present invention may also be applied over elastomeric, plastic, or composite substrates such as those that are found on motor vehicles. By "plastic" is meant any thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. By "composite" is meant any substrate consisting of fibers, typically of glass or carbon, or other filler material that is incorporated with polymeric or plastic materials, commonly of epoxy type polymers.

Each of the characteristics and examples described above, and combinations thereof, may be said to be encompassed by the present invention. In view of the foregoing the present invention relates inter alia to the following nonlimiting aspects:

1. A catalytic composition consisting essentially of:
   (i) a metal compound; and
   (ii) a compound different from (i) that catalyzes an addition reaction between an ethylenically unsaturated compound and a thiol, wherein said catalytic composition is essentially free of vanadium compounds.

2. The catalytic composition according to aspect 1, wherein the catalytic composition is essentially free of reactive compounds comprising acid-functional groups, anhydride groups, or reaction products of an active hydrogen compound with an anhydride or polyacid.

3. The catalytic composition according to any one of aspect 1 or 2, wherein the metal compound (i) comprises at least one of a metal oxide, a metal salt, and an organometallic compound.

4. The catalytic composition according to any one of aspects 1 to 3, wherein the metal compound (i) comprises an iron compound.

5. The catalytic composition according to any one of the preceding aspects 1-4, wherein the compound (ii) comprises a N- and/or P-containing organic compound, such as a primary, secondary or tertiary amine or phosphine.

6. The catalytic composition according to preceding aspect 5, wherein the compound (ii) is selected from one or more of oxazolidines, triethylamine, dimethylcyclohexylamine, dimethyloctylamine, dimethyldodecylamine, dimethylamino ethanol, tetramethyl guanidine, diaza-bicyclo-octane, diaza-bicyclo-undecene, diaza-bicyclo-nonene, n-methyl-triaza-bicyclodecene, trioctyl phosphine and triphenyl phosphine.

7. The catalytic composition according to aspect 5 or 6, wherein the molar ratio of nitrogen (as in an amine or ammonium group) or phosphorus (as in a phosphine or phosphonium group) in the compound (ii) to metal in the metal compound (i) is 0.4 to 500:1.

8. The catalytic composition according to any one of the preceding aspects 1-7, wherein the metal compound (i) comprises an iron compound, the compound (ii) comprises a secondary or tertiary amine group-containing compound, and the molar ratio of amine group to iron is from 0.4 to 500:1.

9. A curable composition comprising:
   (a) a polyene;
   (b) a polythiol, present in an amount greater than 10 percent by weight based on the total weight of resin solids in the curable composition; and
   (c) a catalytic component, which consists of the catalytic composition according to any one of the preceding aspects 1-8; wherein said curable composition is essentially free of vanadium compounds, free radical polymerization initiators, and reactive compounds comprising acid-functional groups, anhydride groups, or reaction products of an active hydrogen compound with an anhydride or polyacid.

10. The curable composition according to aspect 9, wherein the polyene has the structural formula

where A is an organic moiety; X is an olefinically unsaturated moiety and m is at least 2, wherein the polyene A-(X)$_m$ usually comprises a polyurethane (meth)acrylate or polyester (meth)acrylate.

11. The curable composition according to aspect 10, wherein X is selected from —C(O)CR=CH$_2$, —CH$_2$—CHR=CH$_2$, and mixtures thereof, where R is hydrogen or methyl.

12. The curable composition according to any one of aspect 10 or aspect 11, wherein A contains groups selected from ester and urethane groups and/or is derived from a polyisocyanate.

13. The curable composition according to any one of the preceding aspects 9-12, wherein the polythiol has from 2 to 6 thiol groups.

14. The curable composition according to any one of aspects 9 to 13, wherein the polythiol contains ester groups and/or is derived from a polyol.

15. The curable composition according to any one of preceding aspects 9-14, wherein the polythiol comprises a reaction product of a thiol-functional organic acid and a polyol.

16. The curable composition according to any one of the preceding aspects 9-15, wherein the metal compound (i) of the catalytic composition comprises an iron compound, present in the curable composition in an amount of 1 to 1000 ppm metal, based on the total weight of components (a) and (b) in the curable composition.

17. The curable composition according to any one of the preceding aspects 9-16, wherein the compound (ii) of the catalytic composition is present in the curable composition in amounts of 0.001 to 10 percent by weight, based on the total weight of components (a) and (b) in the curable composition.

18. The curable composition according to any one of the preceding aspects 9-17, wherein the equivalent ratio of thiol functional groups in the polythiol (b) to ethylenically unsaturated groups in the polyene (a) is from 0.1 to 10:1.

The present invention will further be described by reference to the following examples. The examples are merely illustrative of the invention and are not intended to be limiting. Unless otherwise indicated, all parts are by weight.

EXAMPLE A

A pigment grind was prepared in a stainless steel beaker according to the following procedure:

| | Mass (g) |
|---|---|
| Charge 1 | |
| Thiocure PETMP[1] | 668.6 |
| DISPERBYK-163[2] | 7.5 |
| BYK-325[2] | 7.5 |
| n-butyl acetate | 71.6 |

-continued

| | Mass (g) |
|---|---|
| Charge 2 | |
| Mapico Black 845[3] | 12.1 |
| n-butyl acetate | 10.8 |
| Charge 3 | |
| Talcron MP 15-38[4] | 417.5 |
| Tioxide TR92[3] | 33.4 |
| n-butyl acetate | 71.6 |

[1]Pentaerythritol tetrakis(3-mercaptopropionate) from BRUNO Bock Chemische Fabrik GmbH & Co. KG.
[2]Dispersing Agent and Flow Additive from BYK USA Inc.
[3]Pigments from Huntsman.
[4]Talc from Barretts Minerals Inc.

After the addition of each of Charges 1 and 2 to the beaker, the mixture was stirred with a Cowles blade for five minutes. After the addition of Charge 3 to the beaker, the mixture was stirred with a Cowles blade for 20 minutes. The mixture of example A was then placed on a Hockmeyer Micromill equipped with 1.2-1.7 mm Zirconox grinding media for 3 hrs, while milling dry ice was placed around the container to control the temperature. The mixture was reduced with 137 g of n-butyl acetate.

Example formulations listed in Table 1 were combined and mixed by hand with a wooden spatula. The compositions of Examples 1A and 1D are comparative in that they do not contain a metal compound (i) as in the catalytic compositions of the present invention. The compositions of Examples 1B and 1E are comparative in that they do not contain a compound (ii) as in the catalytic compositions of the present invention. Examples 1C and 1F represent curable compositions of the present invention.

A 15 g aliquot of each sample was placed in a scintillation vial for measuring liquid curing properties such as; pot life and gel time. Pot life is determined by measuring the change in viscosity over time on a Brookfield CAP 2000 Viscometer using a #1 spindle set at 900 RPM at 25° C. The time it takes for the initial viscosity to double is denoted as the pot life of the sample and is a good indicator of the amount of time available for applying the sample to a substrate.

TABLE 1

| | | Formula by weight (g) | | | | | |
|---|---|---|---|---|---|---|---|
| | | 1A | 1B | 1C | 1D | 1E | 1F |
| Thiocure PETMP[1] | | 37.5 | 37.5 | 37.5 | 0 | 0 | 0 |
| Ebecryl 895[2] | | 32.2 | 32.2 | 32.2 | 25.8 | 25.8 | 25.8 |
| n-butyl acetate | | 28.4 | 26.2 | 25.8 | 17.6 | 15.8 | 15.4 |
| BYK-300[3] | | 0.28 | 0.28 | 0.28 | 0 | 0 | 0 |
| Example A | | 0 | 0 | 0 | 64.4 | 64.4 | 64.4 |
| Iron (III) chloride hexahydrate[4] | | 0 | 2.72 | 2.72 | 0 | 2.17 | 2.17 |
| Catalyst[5] | | 0.56 | 0 | 0.56 | 0.42 | 0 | 0.42 |
| | | Film Properties | | | | | |
| Film thickness (mils) | | 2.0 | 2.1 | 2.0 | 3.0 | 3.3 | 3.2 |
| Pot life (min) | | 15-30 | >300 | >300 | 45-60 | >300 | >300 |
| Tack-free time (min) | | >300 | 0-15 | 0-15 | 30-45 | 0-15 | 0-15 |
| MEK | 1 hour | 0 | 2 | 50 | 28 | 16 | 30 |
| double | 2 hours | 0 | 10 | 66 | 100 | 36 | 100 |
| rubs | 3 hours | 0 | 40 | 90 | 100 | 60 | 100 |

[1]Pentaerythritol tetrakis (3-mercaptopropionate) from BRUNO BOCK Chemische Fabrik GmdH & Co. KG.
[2]Penta-functional acrylate available from Allnex.
[3]Flow Additive from BYK USA Inc.
[4]1 wt % solution of iron (III) chloride hexahydrate in n-butyl acetate
[5]5 wt % solution of triethylenediamine in n-butyl acetate Compositions 1A, 1B and 1C were spray applied using a Devilbiss® GTI HVLP spraygun with a 1.4 mm nozzle. Compositions 1D, 1E and 1F were spray applied using a 3M Accu-Spray HG18 spray gun with a 1.8 mm nozzle. All compositions in Table 1 were applied in 2 coats with a 5 minute ambient flash between coats to 4 inch by 12 inch ACT cold rolled steel panels with an ED6060 electrocoat available from ACT Laboratories, Inc. A dry film thickness of 2.0-3.0 mils was targeted for unpigmented compositions of 1A, 1B and 1C and a higher dry film thickness of 3.0-4.0 mils was targeted for the pigmented compositions 1D, 1E and 1F. After coating application panels were tested for film drying and curing properties at ambient temperature. Tack-free time is the amount of time required for a coating to achieve a level of dryness, such that upon application and removal of a cotton ball, no cotton fibers are transferred to the coating surface. MEK double rubs are reported as the number of double rubs, with a methyl ethyl ketone soaked rag, required to dissolve the coating such that the substrate is visible. MEK double rubs are performed at 1 hour intervals after the film is tack-free and the maximum number of double rubs recorded is 100.

It can be seen from Table 1 that a longer pot-life is achieved with the addition of iron (III) chloride. However the combination of iron (III) chloride and catalyst is necessary to achieve long pot-life, fast tack-free time and rapid development of solvent resistance.

Whereas particular examples of this invention have been described above for purposes of illustration, it will be evident to those skilled in the art that numerous variations of the details of the present invention may be made without departing from the invention as defined in the appended claims.

What is claimed is:

1. A catalytic composition consisting essentially of:
   (i) a metal compound; and
   (ii) a compound different from (i) that catalyzes an addition reaction between an ethylenically unsaturated compound and a thiol, wherein said catalytic composition is essentially free of vanadium compounds.

2. The catalytic composition of claim 1 wherein said catalytic composition is essentially free of reactive compounds comprising acid-functional groups, anhydride groups, and reaction products of an active hydrogen compound with an anhydride or polyacid.

3. The catalytic composition of claim 1 wherein the metal compound (i) comprises at least one of a metal oxide, a metal salt, and an organometallic compound.

4. The catalytic composition of claim 1 wherein the metal compound (i) comprises an iron compound.

5. The catalytic composition of claim 1, wherein said compound (ii) is selected from oxazolidines, triethylamine, dimethylcyclohexylamine, dimethyloctylamine, dimethyldodecylamine, dimethylamino ethanol, tetramethyl guanidine, diaza-bicyclo-octane, diaza-bicyclo-undecene, diaza-bicyclo-nonene, n-methyl-triaza-bicyclodecene, trioctyl phosphine, triphenyl phosphine, and mixtures thereof.

6. The catalytic composition of claim 1, wherein the metal compound (i) comprises an iron compound, the compound (ii) comprises a secondary or tertiary amine group-containing compound, and the molar ratio of amine group to iron is from 0.4 to 500:1.

7. A curable composition comprising:
   (a) a polyene;
   (b) a polythiol,
   and (c) the catalytic component, which consists of the catalytic composition of claim 1, wherein the polythiol is present in an amount greater than 10 percent by weight based on the total weight of (a) the polyene and (b) the polythiol in the curable composition.

8. The curable composition of claim 7 wherein the polyene has the structural formula

where A is an organic moiety; X is an olefinically unsaturated moiety and m is at least 2.

9. The curable composition of claim 8 wherein X is selected from
—C(O)CR=CH$_2$, —CH$_2$—CHR=CH$_2$ and mixtures thereof, where R is hydrogen or methyl.

10. The curable composition of claim 8 wherein A contains groups selected from ester and urethane groups.

11. The curable composition of claim 8 wherein A is derived from a polyisocyanate.

12. The curable composition of claim 8 wherein A-(X)$_m$ comprises a polyurethane (meth)acrylate and/or a polyester (meth)acrylate.

13. The curable composition of claim 7 wherein the polythiol comprises a reaction product of a thiol-functional organic acid and a polyol.

14. The curable composition of claim 7 wherein the polythiol contains from 2 to 6 thiol groups.

15. The curable composition of claim 7 wherein the metal compound (i) of the catalytic composition comprises at least one of a metal oxide, a metal salt, and an organometallic compound.

16. The curable composition of claim 15 wherein the metal compound (i) comprises an iron compound, present in the curable composition in an amount of 1 to 1000 ppm metal, based on the total weight of components (a) and (b) in the curable composition.

17. The curable composition of claim 7 wherein the compound (ii) of the catalytic composition is present in the curable composition in amounts of 0.001 to 10 percent by weight, based on the total weight of components (a) and (b) in the curable composition.

18. The curable composition of claim 7, wherein the metal compound (i) of the catalytic composition comprises an iron compound, the compound (ii) of the catalytic composition comprises a secondary or tertiary amine group-containing compound, and the molar ratio of amine group to iron is from 0.4 to 500:1.

19. The curable composition of claim 7 wherein the equivalent ratio of thiol functional groups in the polythiol (b) to ethylenically unsaturated groups in the polyene (a) is from 0.1 to 10:1.

20. The curable composition of claim 7, wherein said curable composition is essentially free of vanadium compounds, free radical polymerization initiators, and reactive compounds comprising acid-functional groups, anhydride groups, or reaction products of an active hydrogen compound with an anhydride or polyacid.

* * * * *